Nov. 13, 1962      R. M. PALMER      3,063,525
TOE-TIP VACUUM-OPERATED CLUTCH CONTROL SYSTEM
Filed Oct. 6, 1958      2 Sheets-Sheet 1
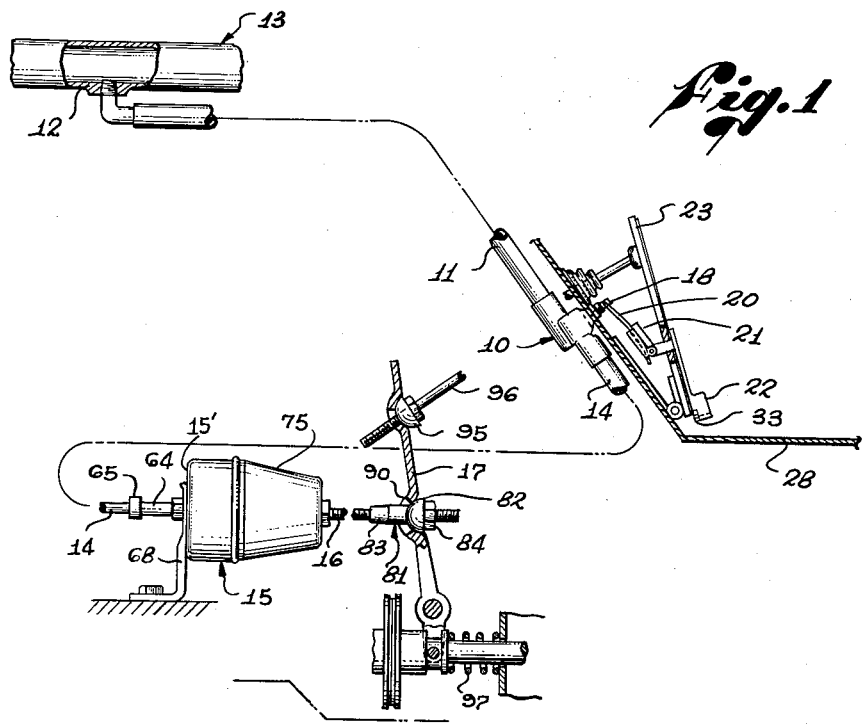
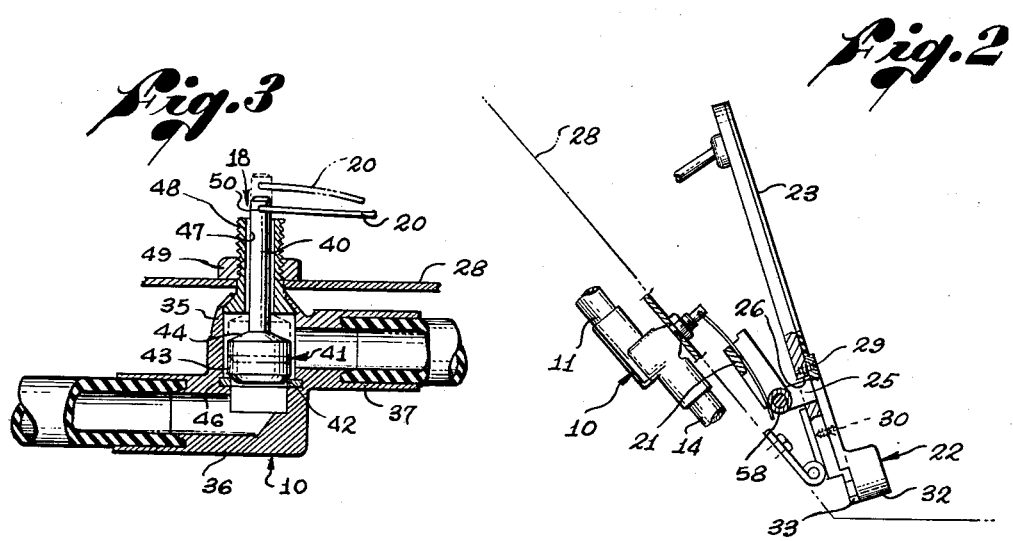
INVENTOR.
RICHARD M. PALMER
BY *Fulwider Mattingly & Huntley*
    *Attorneys*

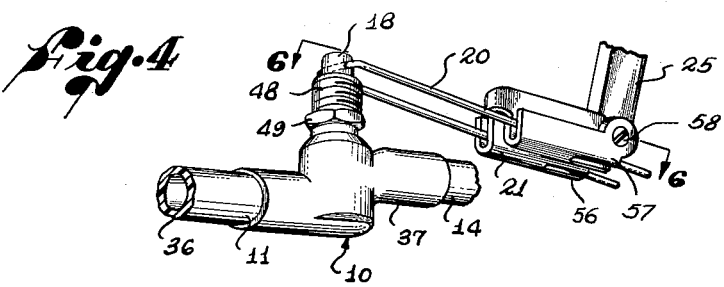
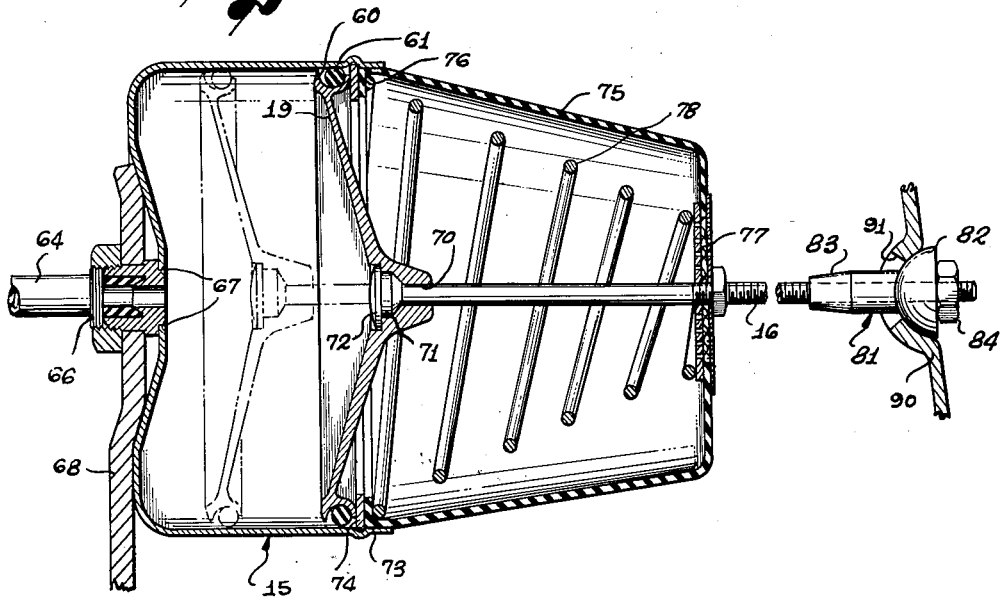
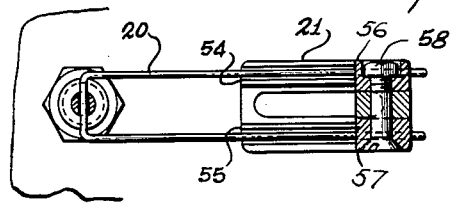

United States Patent Office 3,063,525
Patented Nov. 13, 1962

3,063,525
TOE-TIP VACUUM-OPERATED CLUTCH
CONTROL SYSTEM
Richard M. Palmer, Box 42, Ambassador Station,
Los Angeles, Calif.
Filed Oct. 6, 1958, Ser. No. 765,396
6 Claims. (Cl. 192—.075)

This invention relates to clutch control systems for gas combustion engines, and more particularly to an improved vacuum-operated clutch control system controlled by operation of the accelerator pedal and the engine.

Vacuum-operated clutch control systems of the prior art generally are characterized by a multiplicity of parts, which are susceptible of wear and tear so as to require frequent attention and repair.

Functionally, prior art vacuum-operated clutch control systems utilize an undue number of valve and piston connections, and are characterized by objectionable jerkiness in operating the clutch.

The disadvantage of prior art mechanisms of this type are due to the pressure-demanding construction of the accelerator pedal. As is well known, one must press his foot against the pedal, and keep applying this pressure steadily in order to keep his vehicle traveling at a desired speed. This constant exertion is tiring, and often results in the driver being unable to move the pedal properly in order to cause the vacuum system to operate the clutch in the smoothest possible manner.

Pistons heretofore used for actuating the clutch arm have often failed to operate satisfactorily. A primary cause for such failure has been due to leakage of air and side wall drag between the periphery of the piston and the housing in which it slides. When this happens, the necessary pressure differential for proper operation of the piston cannot be maintained, and erratic operation of the clutch results.

The valves heretofore used in vacuum-operated clutch control systems generally are unduly complex structures, which are difficult (and therefore expensive) to form. Two or more valves are often employed, all of which contributes to the over-all cost and complexity of the system. The engine structure adjacent the intake manifold must be modified to accommodate them therein.

It is an object of this invention to provide a greatly improved system and means for automatically operating the clutch of a gas combustion engine.

It is another object of this invention to provide a vacuum-operated clutch control system wherein a simple valve and piston are connected between the intake manifold and the clutch-actuating arm, and wherein the possible points of failure are reduced to a minimum.

It is a further object of this invention to provide a vacuum-operated clutch control system including a pedal control which requires substantially no pressure to be exerted in driving an automotive vehicle.

A still further object of this invention is to provide a simple valve structure operable to selectively connect a piston to points of low and high pressure, and for causing the clutch to engage and disengage smoothly and positively.

Yet another object of this invention is to provide an improved automatic clutch control system wherein the engagement and disengagement of the clutch is effected by a piston operating in response to a pressure differential, and wherein such piston is arranged to substantially eliminate the possibility of leakage of air around it.

The above and other objects and advantages of this invention will become apparent from the following description, taken in conjunction with the accompanying drawing which illustrates a preferred embodiment thereof, and in which:

FIGURE 1 is a schematic diagram showing the system of this invention connected in an automotive vehicle so as to operate the clutch thereof;

FIGURE 2 is an enlarged sectional view of the toe-tip accelerator pedal arrangement employed in this invention;

FIGURE 3 is a sectional view of the valve connected between the intake manifold and the clutch-actuating piston;

FIGURE 4 is a perspective view of the lost-motion connection for the valve of FIGURE 3;

FIGURE 5 is an enlarged sectional view of the piston, showing its operative connection to the clutch-actuating arm; and FIGURE 6 is a fragmentary sectional view taken along the line 6—6 of FIGURE 4, showing more clearly the adjustment for the lost-motion connection when initially installed.

Referring to FIGURE 1, a valve housing 10 is connected through a forward line 11 to the intake manifold 12 of an internal combustion engine 13. The valve housing 10 is also connected through a rear line to one end of a servo-motor cylinder 15. A piston rod 16 extends from the open end of the cylinder 15, and is adapted to actuate a clutch-actuating arm 17.

The valve and piston arrangement is one in which, in one position of the valve 18, the front of the piston 19 (see FIGURE 5) is exposed to atmospheric pressure, thereby causing the piston rod to move out (to the right in FIGURE 1) to move the arm 17 clockwise and effect engagement of the clutch.

The valve 18 in another position connects the front of the piston 19 to the intake manifold 12, where a varying vacuum exists, i.e., corresponding to the position of the butterfly valve in the carburetor (not shown). In this position of the valve 18, the piston is made to move to the left in FIGURE 1, so as to rock the lower part of the arm 17 clockwise and disengage the clutch.

To allow the valve 18 to assume one of its two positions, it is connected at its outer end to a wire link 20, which in turn is coupled to a bracket 21 secured to a heel plate 22 on the accelerator pedal 23. The link 20 is flexed slightly when the pedal 23 is all the way up, so that under proper conditions it holds the valve in an upper position to permit the piston 19 to be connected to the negative pressure, or vacuum, line 11; the piston in such position of the valve moves to the left to disengage the clutch.

When the pedal 23 moves toward the floorboard, the link 20 functions as a lost-motion connection (see FIGURE 4), and allows the valve 18 to move freely to seat within the housing 10, whereupon air at atmospheric pressure is vented past the valve 18 to the front of the piston 19, so as to drive the piston to the right for engaging the clutch.

To secure the bracket to the heel plate 22, (see FIGURE 2) the plate is provided with a finger element 25 which extends at right angles through aligned openings 26, 27 in the pedal 23 and the floorboard 28. The heel plate is mounted on the pedal, as by a pair of screws 29, 30, after the finger 25 is inserted through the opening 26.

After inserting the finger 25 in the openings 26, 27, the upper screw 29 is threaded into the pedal part way. Then the heel plate 22 is swiveled on the screw 29 until it is properly positioned for holding the spring 20 so that it will not bind in the bracket 21. Upon getting the proper alignment, the lower screw 30 is threaded into the pedal, and then both screws are tightened to fit the heel plate securely on the pedal.

The heel plate 22 has a curved member 32 at the lower end of the pedal, into which the driver's heel is placed. The curved member 32 is spaced above the floorboard 28. Thus, since the driver's whole foot is effectively held on the pedal, all that is necessary for controlling the movement of the pedal is for the driver to lean his foot to move down and up. This is in contrast to prior art pedal arrangements, wherein the reel rests on the floorboard, and the driver must push with the forward part of his foot to move the pedal. Consequently, the heel rest in the system of this invention makes driving easier.

The curved member 32 has slots therein, as indicated at 33. Such slots permit dirt to pass therethrough whereby it cannot accumulate on the heel plate.

As shown, the valve 18 extends through a boss 35 on the housing 10, which is at right angles to two parallel bosses 36, 37 that are connected to the respective lines 11 and 14. The boss 36 is lower on the housing than the boss 37, so that when the valve 18 is in its lower position, the line 11 is effectively decoupled from the line 14.

To effect the desired coupling and decoupling of the lines 11, 14, the valve 18 (see FIGURE 3) includes a stem or shank portion 40 which terminates in an enlarged head portion 41. The head 41 includes a frusto-conical lower section 42, an annular intermediate section 43, and a frusto-conical upper section 44.

The lower frusto-conical section 42 is adapted to seat on a washer or seat ring 46 which is embedded in the housing 10 intermediate the openings into the bosses 36, 37. When the lower frusto-conical section 42 is sealed against the seat ring 46, the connection between the two bosses 36, 37, and hence between the lines 11, 14, is cut off.

The stem portion 40 of the valve extends through a central opening 47 in a guide element 48 secured within the housing 10. The outer end of the guide element 48 is externally threaded and extends through the floorboard 28, where it is secured by a nut 49.

The diameter of the opening 47 in the guide element 48 is slightly larger than the outer diameter of the stem 40. Thus, when the lower frusto-conical portion 42 is against the seat ring 46, the boss 37 is exposed to atmospheric pressure through the opening 47.

When the valve 18 is raised, the upper frusto-conical section 44 closes the lower end of the opening 47, as indicated by the dotted position thereof. In this position of the valve, the bosses 36, 37 and hence the lines 11, 14, are in fluid communication.

The outer end of the valve stem 40 is provided with a transverse opening 50 through which the link 20 is inserted. The opening 40 is considerably larger than the wire. The link 20, which is substantially U-shaped, has its ends extending through the bracket 21 adjacent the sides thereof. As shown, the legs of the link 20 extend over respective ledges 54, 55, and under side projections 56, 57 to the exterior of the bracket.

The bracket 21 is secured to the finger 25 by an adjusting screw 58. The bracket is initially pivoted on the screw 58, when the pedal 23 is up, until the ends of the legs of the link 20 are abutting the lower surfaces of the side projections 56, 57, and the legs are flexed sufficiently to raise the valve 18 to its upper position. Thereupon, the adjusting screw 58 is tightened.

When the pedal 23 is depressed, it will be seen that the force flexing the legs of the link 20 is removed, whereupon the legs straighten. The straightened legs are then carried down with the bracket 21, so that the wire exerts no force on the valve when the pedal is depressed. As will be apparent, as soon as the pedal is depressed, the valve moves to its lower position.

The piston 19 (see FIGURE 5) is broadly conical, and the periphery thereof is formed with an arcuate groove 60 in which an O-ring 61 is seated. The O-ring 61 also engages the inner wall, or head, of the cylinder 15, so as to form an effective seal. The distance between the edges of the groove 60 is slightly larger than the diameter of the O-ring, to permit the O-ring to roll as the piston 19 is moved within the housing, while maintaining the desired seal.

The cylinder 15 is in the form of a cup, with its closed end, i.e., cylinder head, having an opening 63 to which the line 14 is connected. For this purpose, the line 14, which is preferably of metal tubing (e.g., copper) is connected to a short hose section 64 and clamped thereto by a ferrule 65.

The other end of the hose 64 fits into a metal fitting 66 which extends to the opening 63 and is secured, as at 67, to the cylinder 15. The outer surface of the fitting 66 is threaded to receive a bracket 68 to be secured to the body of the vehicle. The hose 64 extends into the fitting as shown.

The piston 19 has a central opening 70 through which the rod 16 passes. The rod 16 has an enlarged head 71 which seats in the opening 70, and which is suitably secured therein, as by a Welch plug 72.

The cylinder 15 is provided with an internal groove 73 adjacent the open end thereof, and a snap ring 74, which may be the well-known tru-arc type of metal snap ring, is snapped into the groove 73. This construction prevents the piston from moving out of the cylinder 15.

The open end of the cylinder 15 is closed by an elastic (e.g., rubber) boot 75. The boot 75 has a rim 76 which abuts the snap ring 74. Embedded in the opposite end of the boot 75 is a disc 77 of porous material, such as spun glass, for admitting air into the interior of the boot. The piston rod 16 extends through the porous disc 77, and a nut is threadedly secured thereon to abut the disc.

To aid in holding the boot in place, a conical spring 78 is disposed therein with the smaller end turn abutting the porous disc 77, and the larger end turn abutting the rim 76. As will be apparent, the spring operates in the presence of equal pressures on the opposite face of the piston 19 to bias the rod 16 to the left. When the front surface is exposed to vacuum, the air pressure on the opposite surface forces the piston forward, carrying the rear end of the spring therewith. Thus, in the disengaged position of the clutch, the spring is compressed, and operates readily to force the rod 16 to the left when the front surface of the piston 19 is exposed to atmospheric pressure.

The threaded end of the piston rod supports a rocker element 81 having a hemispherical end portion 82. The rocker is secured in place between a frusto-conical locknut 83 and an adjusting nut collar 84 on the end of the rod 16.

The locknut 83 has its larger diameter end abutting the rocker element 81. This arrangement permits relative movement of the piston rod 16 and clutch-actuating arm 17 without binding. Such operation is also facilitated by the construction of the lower end of the clutch-actuating arm, as will now be explained.

The clutch-actuating arm 17 (see FIGURE 6) terminates in a curved cup-shaped portion 90, the inner surface of which is contoured like the rocker element 81. Further, the opening 91 in the portion 90 is generally conical, with the smaller diameter thereof adjacent the rocker element.

As the piston rod 16 moves to the left, the cylindrical portion of the rocker element slides within the portion 90. However, there is sufficient frictional engagement during this relative movement to cause the actuating arm 17 to be pivoted counterclockwise for engaging the clutch.

At the end of the movement of the piston rod 16, the lower portion 90 of the arm 17 is enabled to ride on the locknut 83. As will be seen, if the locknut 83 were of the same diameter as the cylindrical portion of the rocker element 81, the arm 17 in rocking might bind thereon. Thus, the tapered surface of the locknut obviates this possibility.

The clutch-actuating arm 17 does not prevent operation of the clutch in the normal manner, i.e., by depressing the conventional clutch pedal. To this end, the arm 17 has secured thereto intermediate its ends, a rocker 95 on the end of a conventional push rod 96. The rod 96 is adapted to be operated by the clutch pedal (not shown) to effect engagement and disengagement of the clutch in the conventional manner. This operation is facilitated by the pivotal movement of the lower end portion 90 of the rod 17. As the rod 96 is actuated by foot pressure, the engaging surfaces of the rocker element 81 and the portion 90 insure smooth movement of the arm 17.

The arm 17 is reutrned to the disengaged position by a spring, as indicated at 97.

In operating the system of this invention, the clutch can be engaged very smoothly. After the engine is started, at which time the valve 18 is held by the spring 20 in its upper position, and the gear selection is made, the operator depresses the accelerator pedal downwardly, and the clutch engages slowly and smoothly. The procedure by which this occurs is one wherein, upon initially depressing the accelerator pedal, the head 41 is sealed against the seat 46, due to the high vacuum in the line 11. Thereupon the piston 19 is exposed to free atmospheric pressure through the line 14 and the opening 47 in the guide 48. This meters air to the piston 19.

Further depressing the accelerator pedal causes the vacuum in the line 11 to be reduced, whereupon the valve becomes a floating member, i.e., it is not in positive sealing engagement with the seat 46 but merely rests thereon. This reduction of vacuum in the line 11, of course, results from opening the butterfly valve as the accelerator pedal is moved toward the floor. In this condition of the valve, and due to the weight of the head 41, there is controlled communication between the head 41 and the seat 46 to provide a feathering action that cooperates with the incoming air through the opening 47 to cause the piston 19 to be slowly separated from the cylinder head 15'. Also, upon the fly-wheel and clutch-facing making contact, the vacuum in the line 11 is further reduced, and the separation between the piston 19 and the head of the cylinder further increases. These actions insure a complete, smooth clutch engagement. Thereafter, the driver operates the accelerator in normal fashion to drive the car at a desired speed.

Changing of gears is accomplished in my automatic system by merely depressing the accelerator pedal and then lifting the foot quickly. This operation occurs because the vacuum in the line 11 is insufficient to hold the head 41 sealed against the seat 46. Therefore, the spring 20, being flexed upon the accelerator moving to its upper position, lifts the valve so that the head 41 seals off the lower end of the opening 47 in the guide 48 from the line 14. The clutch is thereby disengaged, whereupon the gear selection is made, and the pedal is again moved forward to permit the clutch to be engaged.

If one wants to stay on compression, he lifts his foot normally. This slow upward movement of the accelerator pedal allows the vacuum in the line 11 to increase (due to closing of the butterfly valve) so that the head 41 is held against the seat 46. Even though the spring 20 becomes flexed when the accelerator pedal reaches its upper position, the high vacuum in the line 11 keeps the head 41 in positive sealing engagement with the seat 46. In this manner the clutch remains engaged.

An important advantage of my system is that it minimizes chances of "killing" the engine. If the driver suddenly applies the brakes, the clutch is released when coming below the idle in the carburetor. Accordingly, the clutch immediately disengages so as to obviate the type of load condition that causes the engine to cease operating during a sudden stopping of the vehicle.

To shift on an upward slope or hill, the operator lifts his foot; at that point, the vacuum is at its low ebb and the clutch disengages. To shift while going downhill, the accelerator pedal is tipped, as above described for going forward after starting. The tipping in each case is done to drop the vacuum to permit the link 20 to lift the valve.

In order to realize the maximum effectiveness of the valve of my invention, it is adjusted when the system is initially installed so as to seat properly on the ring 46. To make such adjustment, the link 20 is initially left off the valve 18, and the valve is turned within the guide element 48 until it hast he best seating engagement with the ring 46 for operating the piston 19. This operation is arrived at by rotating the valve to different positions while the engine is running, and alternately raising and lowering it to observe the resultant clutch action. When the desired position is found, the wire 20 is coupled to the valve as above described.

It will be readily apparent from the foregoing that although my invention has been described in conjunction with an automobile, it is readily adaptable to any gas combustion engine, whether mobile or stationary. My invention operates to save gas, and wear and tear on the brakes and the clutch.

Another advantage is that if the motor dies while the automobile is in motion, due to the clutch being released by vacuum, the clutch automatically becomes engaged to start the engine. Further, if one wants to slow down while free wheeling, it is not necessary to use the brakes. All that is necessary is to give it the gas in normal manner and slack off normally, whereupon the engine is on compression. In addition, if one wants to continue normal speed attained in free wheeling, he gives it the gas in normal manner; the clutch engagement is so smooth that it cannot be noticed by the passenger.

To free wheel or shift, the operator merely tips his toe and lifts his foot quickly. Otherwise, the automobile is driven in a normal manner. Thus, my invention provides an automatic clutch control system which is cooperatively related with the manual clutch control system so that the clutch can be controlled either manually or automatically without any interference between the manual and automatic controls.

While I have illustrated and described a preferred embodiment of my invention, it will be apparent that many modifications can be made without departing from the spirit and scope thereof. Therefore, I do not intend that my invention shall be limited, except as defined by the appended claims.

I claim:

1. In a clutch control system utilizing the vacuum at the intake manifold of an engine to operate the clutch, a activating mechanism comprising: a cup-shaped housing, the closed end of said housing having a central opening therein; a piston member within said housing, said member having a sealing element about its periphery which engages the inner wall of said housing, said sealing element permitting said member to slide axially within said housing while maintaining an effective seal, said member having a rod secured thereto and movable therewith; a flexible element at one end surrounding said rod and at the other end fitted to the open end of said housing, said flexible element at said one end having a multi-apertured end portion to admit air therein, said end portion being fixed to said rod; spring-bias means extending between the ends of said flexible element; and means to selectively connect the central opening in the closed end of said housing to the intake manifold and to a source of air.

2. A clutch actuating mechanism comprising: a cylindrical housing; a piston member movable in said housing and adapted to effect engagement and disengagement of the clutch upon moving in opposite directions within said housing; a ring seal element of resilient material surrounding said piston member and abutting the inner wall of said cylinder; a flexible closure element extending from one end of said housing, said element having a multi-apertured end portion to admit air into said housing against the adjacent surface of said piston member; a rod fixed to said piston member extending through said end portion, said end portion being secured to said rod; a closure element for the opposite end of said housing having a central opening therein; means to connect said opening to a vacuum source to establish a pressure differential on the opposite surfaces of said piston member, so as to cause said member to assume a position wherein the clutch is disengaged, and to connect said opening to a source of air so as to establish the same pressure on both sides of the piston member; and spring means to urge said piston to a position wherein the clutch is engaged upon establishment of equal pressures on opposite sides of the piston member.

3. In a clutch-actuating system to be operated by the accelerator pedal of a vehicle, wherein a cylinder is to be connected to the intake manifold for disengaging the clutch, and to atmospheric pressure for engaging the clutch, the cylinder including a piston movable in opposite directions for clutch actuation, a valve mechanism for effecting the desired operation of the piston comprising: a valve housing having first and second openings into the interior thereof, for connection respectively to the intake manifold and to the cylinder, said first opening being vertically displaced below said second opening, said housing having a third opening to receive a valve member, said housing having a valve seat therein intermediate said first and second openings; a valve member having a valve stem extending through said third opening, said valve member having a weighted head for seating against said seat in one position, said valve stem being smaller than said third opening so as to admit air therealong and into said second opening when said head is seated; and a flexible link element for connecting said valve member to the accelerator pedal, said link element being a lost-motion connection when the pedal is depressed, thereby to permit the valve member to be seated, said link element lifting said valve member from the seat in the undepressed position of the pedal when the vacuum at said third opening is reduced, thereby to effect communication between said first and second openings for connecting the cylinder to the intake manifold.

4. In an automotive vehicle having an engine with an intake manifold, a clutch control system to be operated by the accelerator pedal comprising: a servo-motor device including a cylinder and a slidable piston movable to a first position in disengagement of the clutch, and to a second position in engagement of the clutch; a valve having a port connection to the intake manifold and a port connection to the cylinder, said valve including a weighted valve member movable between an upper position in which it effects communication between said ports to permit said piston to assume its first position, and a lower position in which it permits air to be directed to said cylinder for moving said piston; and a flexible link connected at its ends to said valve member and to the pedal, said link permitting said valve member to move to its lower position when the pedal is depressed, said link being able to raise said valve member to its upper position on releasing the pedal only when insufficient force exists to hold it in its lower position.

5. In an automotive vehicle having an engine with an intake manifold, a clutch control system to be operated by the accelerator pedal comprising: a fluid motor device including a cylinder in which a piston is movable to a first position in disengagement of the clutch, and to a second position in engagement of the clutch; and valve means operable by the accelerator pedal so as to couple the cylinder and intake manifold when the pedal is undepressed for causing the piston to assume its first position, and to feed air to the cylinder when the pedal is depressed for causing the piston to move to its second position, said valve means including a housing having three openings into a chamber therein, one opening being located in a lower portion of the housing than either of the other openings; means to connect said one opening to the intake manifold; means to connect a second opening to the cylinder; a valve element having a weighted portion in said chamber adapted to seat over said one opening, said weighted portion being slidable between said one opening and the remaining opening; and flexible link means connected to said valve element for operation by the pedal, said link means upon depressing the pedal permitting the valve element to be lowered and said weighted portion to seat over said one opening, said link means flexing upon the pedal being lifted to permit said valve element to remain seated over said one opening in the presence of a predetermined vacuum at the intake manifold, said flexed link means thereafter unflexing and carrying the valve element to close off said remaining opening when the vacuum is less than said predetermined vacuum.

6. An accelerator-operated clutch control system for automotive vehicles, wherein the engine has an intake manifold, comprising: a housing including a valve having a first and a second position, said valve being adapted to move under gravity from said first to said second position; a servo motor having a piston adapted to move in opposite direction upon engagement and disengagement of the clutch; a first fluid connection from the intake manifold to a lower portion of said housing, said housing having an opening at said lower portion to be covered by said valve in its second position; a second fluid connection from the servo motor to a second portion of said housing above said lower portion, said housing having an opening at said second portion, said housing having a third opening to the atmosphere, said valve in its first position closing said third opening, said opening at said second portion being in fluid communication with said opening at said lower portion in the first position of said valve, and in fluid communication with the atmosphere when said valve is in its second position; and a mechanical connection from the valve to the accelerator pedal to permit said valve to assume its second position when the accelerator pedal is depressed to vent air to the servo motor, said mechanical connection in the undepressed position of the pedal being operable to raise said valve to its first position when the vacuum in said first fluid connection is less than a predetermined amount, but being unable to raise said valve while the vacuum is greater than said predetermined amount.

References Cited in the file of this patent

UNITED STATES PATENTS

| | | |
|---|---|---|
| 1,964,764 | Lippert | July 3, 1934 |
| 2,105,494 | Palmer | Jan. 18, 1938 |
| 2,105,495 | Palmer | Jan. 18, 1938 |
| 2,109,101 | Clarke | Feb. 22, 1938 |
| 2,137,544 | Price et al. | Nov. 22, 1938 |
| 2,156,136 | Watts | Apr. 25, 1939 |
| 2,173,116 | Kliesrath | Sept. 19, 1939 |